US008731301B1

(12) United States Patent
Bushman et al.

(10) Patent No.: US 8,731,301 B1
(45) Date of Patent: May 20, 2014

(54) DISPLAY ADAPTATION BASED ON CAPTURED IMAGE FEEDBACK

(75) Inventors: Serge J. L. Bushman, Overland Park, KS (US); Michael A. Gailloux, Overland Park, KS (US); Carl J. Persson, Olathe, KS (US); Thomas H. Wilson, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1011 days.

(21) Appl. No.: 12/238,148

(22) Filed: Sep. 25, 2008

(51) Int. Cl.
*G06K 9/18* (2006.01)
*G06K 9/00* (2006.01)
*G06F 17/00* (2006.01)
*G06K 7/10* (2006.01)

(52) U.S. Cl.
USPC ........... 382/189; 382/183; 235/375; 235/461; 235/462.01; 235/462.1; 235/462.11

(58) Field of Classification Search
USPC ................................ 700/3–10; 705/14, 35–37
See application file for complete search history.

(56) References Cited

U.S. PATENT DOCUMENTS

| 7,958,081 | B2 * | 6/2011 | Fitzpatrick et al. ............... 1/1 |
| 2005/0011958 | A1 * | 1/2005 | Fukasawa et al. ....... 235/462.46 |
| 2005/0137958 | A1 * | 6/2005 | Huber et al. ................ 705/37 |
| 2007/0073585 | A1 * | 3/2007 | Apple et al. ................ 705/14 |
| 2008/0089552 | A1 * | 4/2008 | Nakamura et al. .......... 382/100 |
| 2008/0201305 | A1 * | 8/2008 | Fitzpatrick et al. ............. 707/3 |
| 2010/0306318 | A1 * | 12/2010 | Fitzpatrick et al. .......... 709/206 |

FOREIGN PATENT DOCUMENTS

GB          2420894 A  *  6/2006

* cited by examiner

*Primary Examiner* — Amir Alavi
*Assistant Examiner* — Kenny Cese

(57) ABSTRACT

A computer implemented method is provided for display adaptation based on captured image feedback. Content that comprises a marker is displayed. An image of the content is captured by a mobile device. Whether the marker in the image is recognized is determined. The marker in the image is analyzed in response to a determination that the marker in the image is not recognized. The content is adjusted based on the analyzed marker. The adjusted content is displayed. The marker in the image is analyzed to determine at least one of a time and a location associated with capturing the image of the content in response to a determination that the marker in the image is recognized. Another content is displayed based on at least one of the time and the location determined by analyzing the marker.

14 Claims, 5 Drawing Sheets

DISPLAY ADAPTATION BASED ON CAPTURED IMAGE FEEDBACK

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A billboard may be a large outdoor advertising structure typically found in high traffic areas, such as alongside busy roads. Billboards present large advertisements to passing pedestrians and drivers. Typically showing large, witty slogans and distinctive visuals, billboards are highly visible in many market areas. Bulletins are the largest, standard-size billboards. Located primarily on major highways, expressways or principal arterials, bulletins command high-density consumer exposure, mostly to vehicular traffic. Bulletins afford greatest visibility due not only to their size, but because they allow creative "customizing" through extensions and embellishments. Posters are another common form of billboard advertising, located chiefly in commercial and industrial areas on primary and secondary arterial roads. Posters are a smaller format than bulletins and are viewed principally by residents and commuter traffic, with some pedestrian exposure.

SUMMARY

In some embodiments, a computer implemented method is provided for display adaptation based on captured image feedback. Content that comprises a marker is displayed. An image of the content is captured by a mobile device. Whether the marker in the image is recognized is determined. The marker in the image is analyzed in response to a determination that the marker in the image is not recognized. The content is adjusted based on the analyzed marker. The adjusted content is displayed.

In other embodiments, a system is provided for display adaptation based on captured image feedback. The system includes a display, a camera, and a server. The display displays content that includes a marker. The camera is associated with a mobile device and captures an image of the content. The server receives the image from the mobile device, provides information based on the marker to the mobile device, and provides another content that includes another marker to the display. The display displays the other content.

In still other embodiments, a method is provided for display adaptation based on captured image feedback. Content that includes a marker is displayed. An image of the content is captured by a mobile device. The marker in the image is recognized. The recognized marker in the image is analyzed to determine at least one of a time and a location associated with capturing the image of the content. Another content is displayed based on the analyzed marker.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
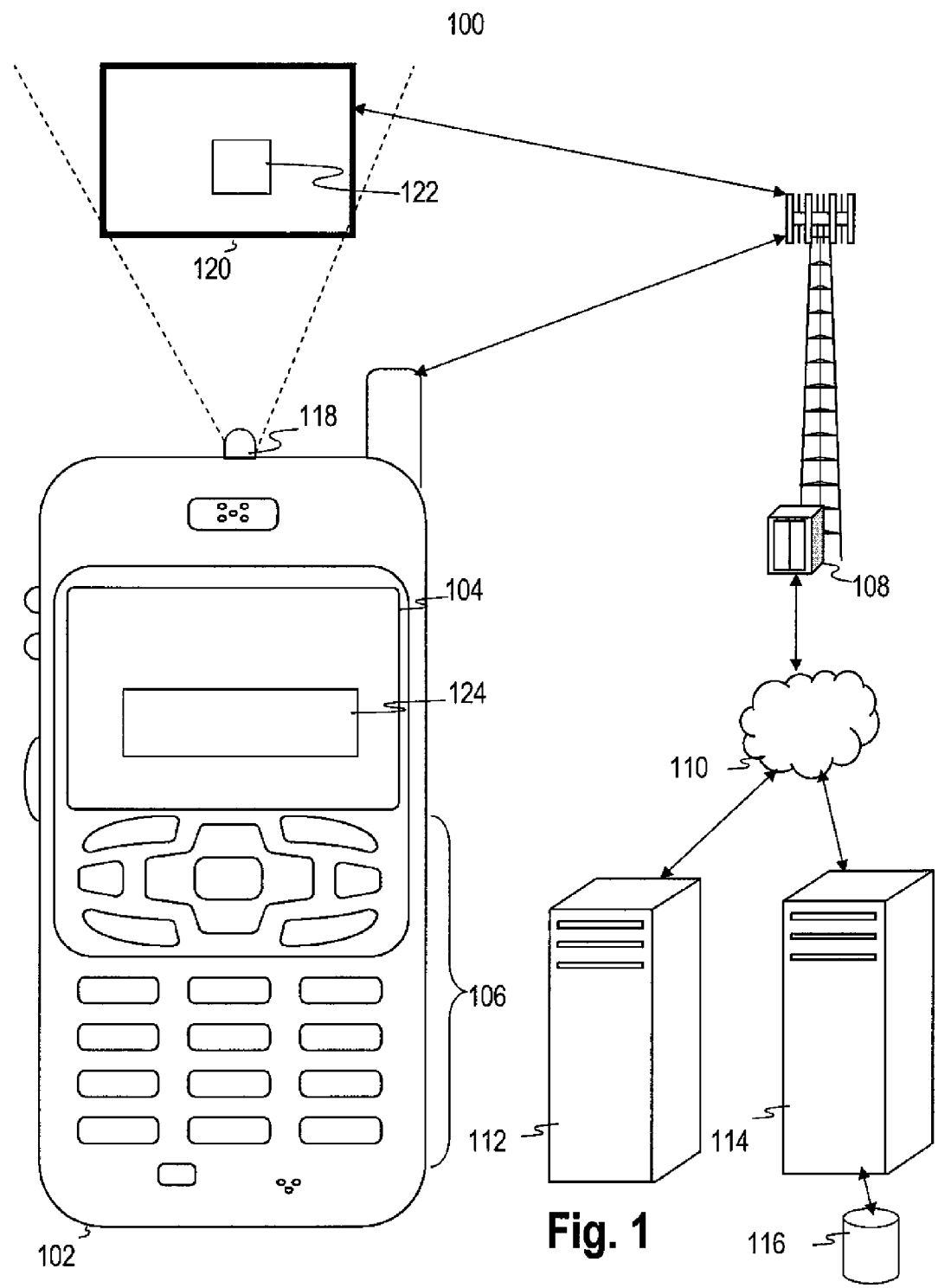
FIG. 1 shows an illustrative wireless communications system for display adaptation based on captured image feedback according to some embodiments of the present disclosure.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

New billboards are being produced that are entirely digital, using light emitting diodes (LED) and similar techniques, allowing static or dynamic advertisements to rotate in succession. Interaction is an emerging process identified with digital billboards. Some billboards respond with an animated wave when passersby wave at them. Some billboards contain an embedded computer chip which can interact with the web browser found in many cell phones to provide more information on the subject of the advertisement. Some billboard technologies synchronize with advertisements on radio stations.

A display may be a billboard, a bulletin, or a poster. Some displays provide additional information to viewers through the use of markers, which may be a two dimensional bar code such as a circular shot code, or any asymmetrical pattern. Some billboards, bulletins, and posters display markers so that when images of these markers are captured by a camera, a mobile device that includes the camera may provide the captured image to a computer. The computer can recognize the marker in the camera image and can provide additional information to the mobile device based on the recognized marker.

Displays that include markers may pose drawbacks compared to traditional billboards, bulletins, and posters. The angle between a display and a camera may distort the captured image of the marker, or limited light for the display may make the marker in the captured image difficult to recognize. Furthermore, the display may be highly reflective and reflect an excess of light that makes marker recognition difficult.

In embodiments of the present disclosure, methods and systems are provided for display adaptation based on captured image feedback. A billboard may display an advertisement that includes a marker so that a mobile device camera may capture an image of the advertisement. The mobile device may transmit the image to a server that may determine whether the marker in the image is recognized. If the marker in the image is not recognized, the server may analyze the marker in the image based on factors such as the distance between the camera and the billboard, the angle between the camera and the billboard, and the camera settings. The server may compare the image captured by the camera with images captured by other cameras to determine the identity of the unrecognized marker. Even though a match can enable the server to provide information associated with the previously unrecognized marker to the mobile device, the reasons for the non-recognition of the marker may continue to exist for subsequent cameras at the same billboard location. Therefore, the server may adjust the advertisement based on the analyzed marker by making the marker larger, darker, or brighter, for example. The server may adjust the advertisement based on images from multiple cameras to produce an adjusted advertisement that has a recognizable marker for many cameras. The billboard may display the adjusted advertisement so that subsequent cameras have an improved opportunity of capturing images that result in recognized markers. If the camera still has problems capturing an image that produces a recognized marker, the server may offer recommendations to the mobile device, such as adjusting a zoom lens for the camera, or enabling the mobile device to receive a properly captured image from a nearby mobile device.

In other embodiments, a billboard displays an advertisement that includes a marker. A camera associated with a mobile device captures an image of the advertisement. A server receives the image from the mobile device, provides information based on the marker to the mobile device, and provides another advertisement that includes another marker to the billboard which displays the other advertisement. The server may select the other advertisement based on a determined level of interest. For example, if images are seldom captured of the billboard when the billboard is displaying an advertisement of an attractive man during rush hour traffic, but images are frequently captured of the billboard when the billboard is displaying an advertisement of an attractive woman during rush hour traffic, the server may select advertisements of an attractive woman to replace the advertisement of an attractive man during rush hour traffic.

In still other embodiments, a billboard may display an advertisement that includes a marker. A mobile device may capture an image of the advertisement. A server may recognize the marker in the image. The server may analyze the recognized marker to determine a time and/or a location associated with capturing the image of the advertisement. Although some mobile device users may permit the server to access time and location information associated with their mobile devices, many mobile device users may not permit the server to access time and location information associated with their mobile devices. Therefore, the server modifies the marker to include time and/or location information based on the time of day that the marker is displayed and the location of the billboard displaying the marker. The server may use this time and location information provided by the marker to evaluate when images are captured of the billboard advertisements and which billboards are resulting in the most captured images being sent to the server. This information may enable the billboard provider to suggest times and locations for advertisements to be most effective. The billboard may display another content based on the analyzed marker, such as rotating an advertisement once a specified number of captured images have been sent to the server for that billboard.

FIG. 1 shows a wireless communications system 100 that illustrates the context for the present disclosure's systems and methods. The wireless communication system 100 includes an illustrative mobile device 102. Though illustrated as a mobile phone, the mobile device 102 may take various forms including a personal digital assistant (PDA), a mobile telecommunication device, a mobile handset, a mobile computer, a handheld gaming device, a wireless mobile device, a pager, a portable computer, a tablet computer, a laptop computer, a digital camera, a media player, a digital music player, and a digital calculator. Many suitable mobile devices combine some or all of these functions.

The mobile device 102 includes a display 104 and a touch-sensitive surface or keys 106 with which a user can interact. The mobile device 102 may present options for the user to select, controls for the user to actuate, and/or cursors or other indicators for the user to direct. The mobile device 102 may further accept data entry from the user, including numbers to dial or various parameter values for configuring the operation of the mobile device 102. The mobile device 102 may further execute one or more software or firmware applications in response to user commands. These applications may configure the mobile device 102 to perform various customized functions in response to user interaction, such as capturing images from displays, transmitting the captured images, and receiving information associated with the captured images.

In the illustrative system 100, the mobile device 102 communicates through a base transceiver station 108 and a wired or wireless network 110 to access information on various servers, such as a communication server 112 and a content server 114. Although FIG. 1 depicts one communication server 112 and one content server 114, the functions of the servers 112-114 may be combined in only one server 112 or 114, or distributed across multiple communication servers 112 and content servers 114. The content server 114 may provide content or information that may be shown on the display 104. The content server 114 may access a database 116 of content or information that may be provided to the mobile device 102. In some embodiments, the function of the content server 114 and the database 116 is incorporated in the mobile device 102 instead of in the content server 114 and the database 116 that communicate with the mobile device 102. While one base transceiver station 108 is shown in FIG. 1, other base transceiver stations 108 could be present.

The mobile device 102 includes a camera 118 that may capture an image of a display 120 that includes a marker 122, whereby an image of the display 120 may be viewed through the display 104. The display 120, which may be a billboard, a bulletin, a poster, or other information display, may be oriented for viewing by multiple individuals using multiple cameras 118. The display 120 may display the content that includes the marker 122 simultaneously with other content that includes another marker 122, such as displaying two different advertisements simultaneously, where each advertisement includes its own marker 122 or a single shared marker 122. The display 120 may communicate with the communication server 112 and/or the content server 114 via a wireless link to the base transceiver station 108 and via a wired link from the base transceiver station 108 to the network 110. Alternatively, the display 120 may communicate with the communication server 112 and/or the content server 114 through a wired link (not shown) to the network 110. In FIG. 1, the camera 118 is depicted on the top of the mobile device 102, but the camera 118 may be located anywhere on the mobile device 102, such as on the opposite side of the mobile device 102 from the display 104.

The marker 122 may be any of a moving marker, a one dimensional bar code, a two dimensional bar code, a color light pattern, an asymmetrical pattern, and an asymmetrical pattern such as a shot code or a SEMACODE. The marker 122 may be a moving marker if the position of the marker 122 changes in relation to the display 120 or if the marker 122 dynamically changes, such as an animated character. For example, the marker 122 may be moved from an upper left corner of the display 120 to a lower right corner of the display 120. As another example, the marker 122 may change in size and be presented on a different percentage of the area of the display 120. In both of these examples the marker 122 may be considered to be a moving marker. In some circumstances, the location of a moving marker within the display 120 may indicate metadata, for example a particular display 120 among a plurality of displays 120 that may display the same information such as an advertisement. The color light pattern may be a combination of different colors of light that are arranged in a manner that uniquely identifies a marker. The display 120 that displays content that includes the marker 122 may communicate with the content server 114 and the database 116 via the network 110 or via wired communication.

The mobile device 102 may communicate an image of the content of the display 120 that is captured by the camera 118 to the communication server 112, which may parse the image of the content to identify the marker 122. The communication server 112 may communicate the marker 122 to the content server 114, which may access the database 116 to recognize the marker 122. If the marker 122 is recognized, the content server 114 may access information in the database 116 that corresponds to the marker 122 and communicate the information via the communication server 112 to the mobile device 102, which may display the information 124 on the display 104. Examples of the information include a website address that may be used to purchase tickets for an advertised movie, a website address that may be used to provide driving directions to an advertised restaurant, and a website address that may be used to provide an electronic coupon for an advertised pizza.

Figure 2:
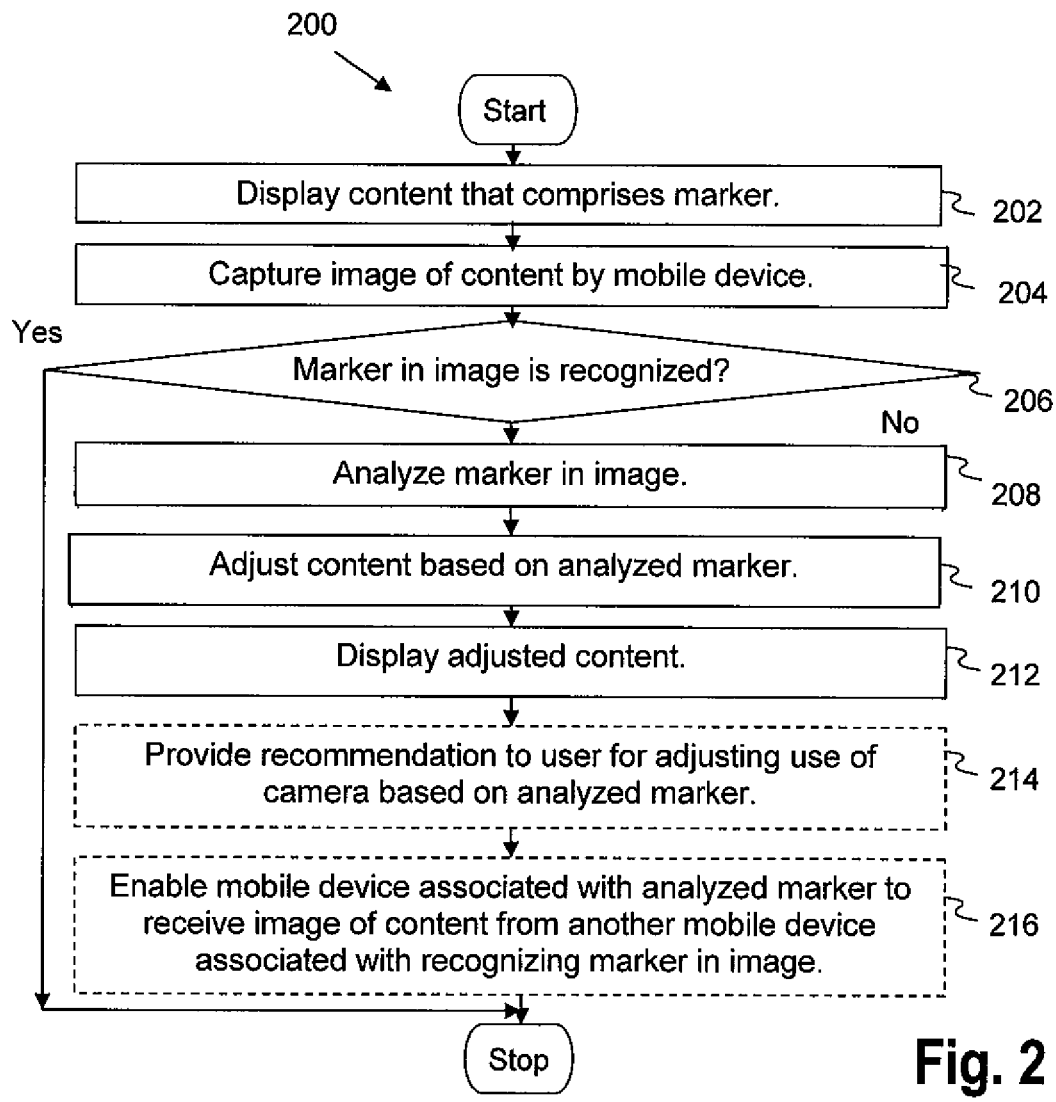
FIG. 2 is a flowchart of a method for display adaptation based on captured image feedback according to some embodiments of the present disclosure.

FIG. 2 shows a flowchart of a method 200 for display adaptation based on captured image feedback according to some embodiments of the present disclosure. The system 100 can execute the method 200 to adjust the content on the display 120 when the marker in the captured image of the display's 120 content is not recognized.

In box 202, content that comprises a marker is displayed. For example, the display 120 displays a movie advertisement that includes a marker 122 that is associated with a website address that may be used to purchase tickets for the advertised movie.

In box 204, an image of the content is captured by a mobile device. For example, the mobile device's 102 camera 118 captures an image of the movie advertisement that includes the marker 122 associated with the website for purchasing the movie tickets.

In box 206, whether the marker in the image is recognized is determined. For example, the mobile device 102 communicates the image of the advertisement that includes the marker 122 to the communication server 112, which parses the marker 122 and conveys the marker 122 to the content server 114, which determines whether the marker 122 in the image is recognized. If the marker 122 in the image is not recognized, the method continues to box 208. If the marker 122 in the image is recognized, the method terminates. Alternatively, if the marker 122 in the image is recognized, the method may execute boxes similar to boxes 406-412 depicted in FIG. 4.

In box 208, the marker in the image is analyzed in response to a determination that the marker in the image is not recognized. For example, the content server 114 analyzes the marker 122 in the image in response to a determination that the marker 122 in the image of the movie advertisement is not recognized.

Analyzing the marker 122 may include identifying the marker 122 based on a location associated with capturing the image of the content and/or a comparison of the image of the content with an image for which the marker 122 is recognized. For example, the content server 114 identifies the marker 122 based on the cell sector used by the mobile device 102 to transmit the image captured by the camera 118. In this example, the content server 114 may determine that only one display 120 is within the cell sector used by the mobile device 102 to transmit the image, and the transmitted image meets a threshold for matching the content of the movie advertisement associated with the display 120. In another example, the content server 114 identifies the marker 122 based a comparison of the image of the movie advertisement with an image of the movie advertisement for which the marker 122 is recognized. In this example, the content server 114 compares the image transmitted by the mobile device 102 with images transmitted by other mobile devices 102, where the images transmitted by other mobile devices 102 include markers 122 that are recognized.

Having identified the marker 122, the content server 114 may provide information associated with the identified marker 122 to the mobile device 102. Furthermore, the content server 114 analyzes the identified marker 122 to determine why the identified marker 122 was not recognized. Analyzing the marker 122 may include determining a relationship of the image to the content based on at least one of the content, a size of the image, a camera setting, an inferred angle for capturing the image, and an inferred distance for capturing the image. For example, the content server 114 determines the relationship of the image of the movie advertisement to the movie advertisement itself based on the marker 122, which is thirty inches high by thirty inches wide, and an image of the movie advertisement, which is only two inches high by two inches wide. In this example, the marker 122 in the image of the movie advertisement may be too small for the resolution of the image to permit the marker 122 to be recognized because the camera setting for the zoom lens did not provide sufficient magnification.

In another example, the content server 114 determines an inferred angle for capturing the image and an inferred distance for capturing the image based on the image of the movie advertisement in relation to the known movie advertisement. For example, if the marker 122 on the display 120 is thirty inches high, and the image of the marker depicts the marker 122 as 1 inch high, the content server 114 combines mathematical formulas with product specifications for the mobile device 102 to estimate the distance from the mobile device 102 to the display 120. If the image of the marker depicts the marker 122 as 1.5 inches high on the left edge of the marker 122 and 1 inch high on the right edge of the marker 122, the content server 114 infers, based on the observed perspective foreshortening, that the mobile device 102 must be much closer to the left edge of the marker than to the right edge of the marker 122. In addition to the mathematical formulas and product specifications used to estimate the distance from the mobile device 102 to the display 120, the content server 114 may use trigonometric formulas to estimate the angle from which the mobile device 102 captured the image of the marker 122.

Analyzing the marker 122 may include analyzing at least one of a number of determinations that the marker 122 in the image is not recognized and a number of determinations that the marker 122 in the image is recognized. The content server 114 recognizes the marker 122 in the image if the content server can match the marker 122 in the image to any of the markers in the database 116 that are associated information in the database 116. For example, the content server 114 analyzes five determinations that the marker 122 transmitted by the mobile device 102 is not recognized and fifteen determinations that the marker 122 transmitted by other mobile devices 120 is recognized. The analysis of the non-recognized markers 122 and the recognized markers 122 may identify reasons why the non-recognized markers 122 were not recognized, such as an insufficient zoom setting or a capture angle that distorts the image of the marker 122 too much for recognition.

In box 210, the content is adjusted based on the analyzed marker. For example, the communication server 112 adjusts the content of the movie advertisement, including the marker 122, based on the analyzed marker 122. Adjusting the content may include modifying a size of the marker 122, modifying a background of the content, modifying a color of the marker 122, modifying a brightness of the content, modifying a contrast of the content, and relocating the marker 122 within the content. For example, the content server 114 doubles the size of the marker 122, modifies the color of the marker 122 from blue to black, modifies a background color of the movie advertisement from yellow to white, and relocates the marker 122 from the top of the movie advertisement to the bottom of the movie advertisement, which is closer to the camera 118 based on the inferred angle of the captured image. In another example, the content server 114 modifies the brightness and the contrast of the movie advertisement based on the detected light for the captured image, which may depend on the lighting for the display 120 and weather conditions such as clouds, rain, and the amount of sunshine.

Adjusting the content based on the analyzed marker 122 may include adjusting the content based on a plurality of analyzed markers 122 associated with the content. For example, the content server 114 adjusts the movie advertisement based on twenty analyzed markers 122 associated with the movie advertisement, including the five non-recognized markers 122 and the fifteen recognized markers 122. The plurality of analyzed markers 122 may include a plurality of analyzed markers 122 that are each associated with a plurality cameras 118 that are identified as candidates for capturing the adjusted content to provide a future recognition of the marker 122. For example, the content server 114 adjusts the movie advertisement based on four of the five cameras 118 that provided an image that resulted in a non-recognized marker 122 to enable the four cameras 118, or similarly situated cameras 118, to capture an image of the movie advertisement that will likely result in recognized markers 122. However, the content server 114 does not identify a poor quality camera 118 as a candidate for capturing an image of the movie advertisement that results in a recognized marker 122. Therefore, the content server 114 does not adjust the movie advertisement based on the poor quality camera 118, or a camera 118 that is capturing images from an angle that is too sharp for recognizing the marker 122.

By adjusting display of content, the content server 114 may compensate for the angle that the camera 118 is capturing the image of the content. For example, the content server 114 adjusts the content to compensate for a capture angle from below the display 120 that distorts a bar code. In this example, the content server 114 adjusts the bar code marker 122 to display narrower bars towards the bottom of the movie advertisement, to compensate for the image of broader bars at the bottom, and display broader bars towards the top of the movie advertisement, to compensate for the image of narrower bars towards the top. The content server 114 may adjust the content by automatically adjusting a distance between pixels. For example, the communication server 112 may adjust the marker 122 by automatically decreasing the distance between pixels for the portion of the barcode that are displayed towards the bottom of the display 120 and automatically increasing the distance between pixels for the portions of bars that are displayed towards the top of the display 120. The content server 114 may adjust the content based on a determined reflection. For example, if the content server 114 determines that the display 120 has high level of reflectivity, the content server 114 automatically uses a lower level of brightness to display the movie advertisement on the display 120. Although box 210 illustrates example of dynamically adjusting a digital display 120, the method may also apply to adjusting the content for a fixed display, such as a static display 120.

In box 212, the adjusted content is displayed. For example, the display 120 displays the adjusted movie advertisement that includes the marker 122, which is larger, displayed in black, and relocated towards the bottom of the movie advertisement.

In box 214, a recommendation is optionally provided to a user for adjusting use of a camera based on the analyzed marker. For example, the content server 114 provides a recommendation to a user of the mobile device 102 to adjust the zoom setting of the camera 118 based on the analyzed marker 122 that indicates the analyzed marker is too small to be recognized. Alternatively, the content server 114 provides a recommendation to a maintenance worker for the display 120 to clean the glass that covers the movie advertisement.

In box 216, the mobile device associated with the analyzed marker is optionally enabled to receive the image of the content from another mobile device associated with recognizing the marker in the image. For example, the communication server 112 enables the mobile device 102 that provided the non-recognized marker 122 to receive by peer-to-peer communication the image of the movie advertisement from another mobile device 102 that provided a recognized marker 122. In another example, the communication server 112 transfers the image of the movie advertisement from another mobile device 102 that provided a recognized marker 122 to the mobile device 102 that provided the non-recognized marker 122.

Figure 3:
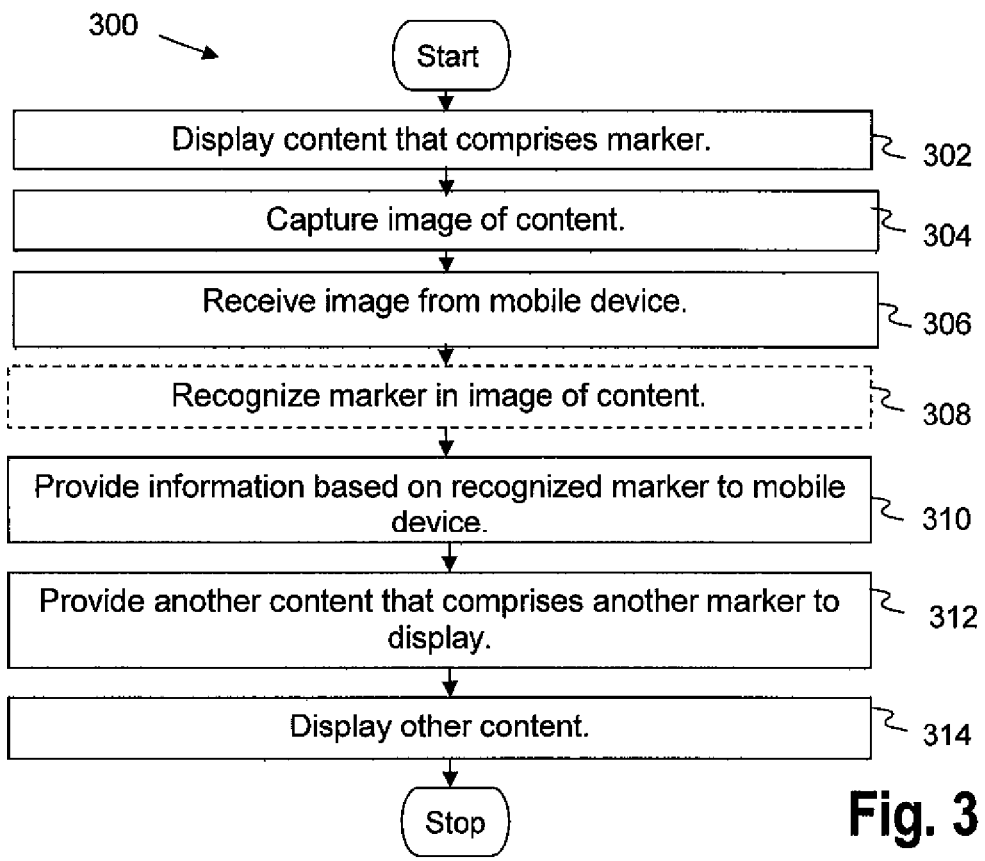
FIG. 3 is a flowchart of another method for display adaptation based on captured image feedback according to some embodiments of the present disclosure.

FIG. 3 shows a flowchart of a method 300 for display adaptation based on captured image feedback according to some embodiments of the present disclosure. The system 100 can execute the method 300 to select content for display based on captured images.

In box 302, content that includes a marker is displayed. For example, the display 120 displays a restaurant advertisement that includes an image of an attractive woman eating at the restaurant, an image of an attractive man eating at the restaurant, and the marker 122, which is associated with a website address that may be used to provide driving directions to the restaurant.

In box 304, an image is captured of the content. For example, the camera 118 of the mobile device 102 captures an image of the restaurant advertisement that includes the marker 122 associated with driving directions.

In box 306, the image is received from the mobile device. For example, the communication server 112 receives the image of the restaurant advertisement from the mobile device 102, parses the marker 122 from the image, and transmits the image of the marker 122 to the content server 114.

In box 308, recognizing the marker in the image of the content is optionally promoted. For example, the content server 114 accesses the database 116 to recognize the marker 122 in the image of the restaurant advertisement. The database 116 may include a plurality of markers and a plurality of information, wherein each the plurality of markers is associated with at least one of the plurality of information, and wherein the mobile device 102 displays the information based on accessing the database 116. For example, the database 116 includes a website address for driving directions that is associated with the marker 122.

In box 310, information based on the marker is provided to the mobile device. For example, the communication server 112 provides the website address for driving directions to the restaurant to the mobile device 102.

In box 312, another content that comprises another marker is provided to the display. For example, the content server 114 selects another restaurant advertisement that includes another marker 122 for the display 120. The content server 114 may provide the other content that includes the other marker 122 to the display 120 based on providing the information to a plurality of mobile devices 102. For example, having provided the driving directions to fifty mobile devices 102 based on the restaurant advertisement, the content server 114 provides another restaurant advertisement that includes another marker to the display 120 based on a rotation of advertisements.

The content server 114 may select the other content based on a determined level of interest in the other content. For example, the content server 114 determines that 60% of the captured images focus more on the attractive female in the restaurant advertisement. In response to the level of interest in the portion of the restaurant advertisement that includes the attractive female, the content server 114 may select the other content to either reinforce the level of interest or to counter the level of interest. For example, if the content server 114 infers that most of the drivers who pass the display 120 are male drivers that capture the image of the attractive woman, the content server 114 may select to replace the image of the attractive man in the restaurant advertisement with an image of another attractive woman. In another example, if the content server 114 infers that many of the drivers who pass the display 120 are female drivers that do not capture the image of the attractive man, the content server 114 may select to either increase the size of the image of the attractive man in the restaurant advertisement or to replace the image of the attractive man with an image of a potentially more attractive man.

In box 314, the other content is displayed. For example, the display 120 displays a restaurant advertisement that includes the attractive woman, the potentially more attractive man, and the marker 122.

Figure 4:
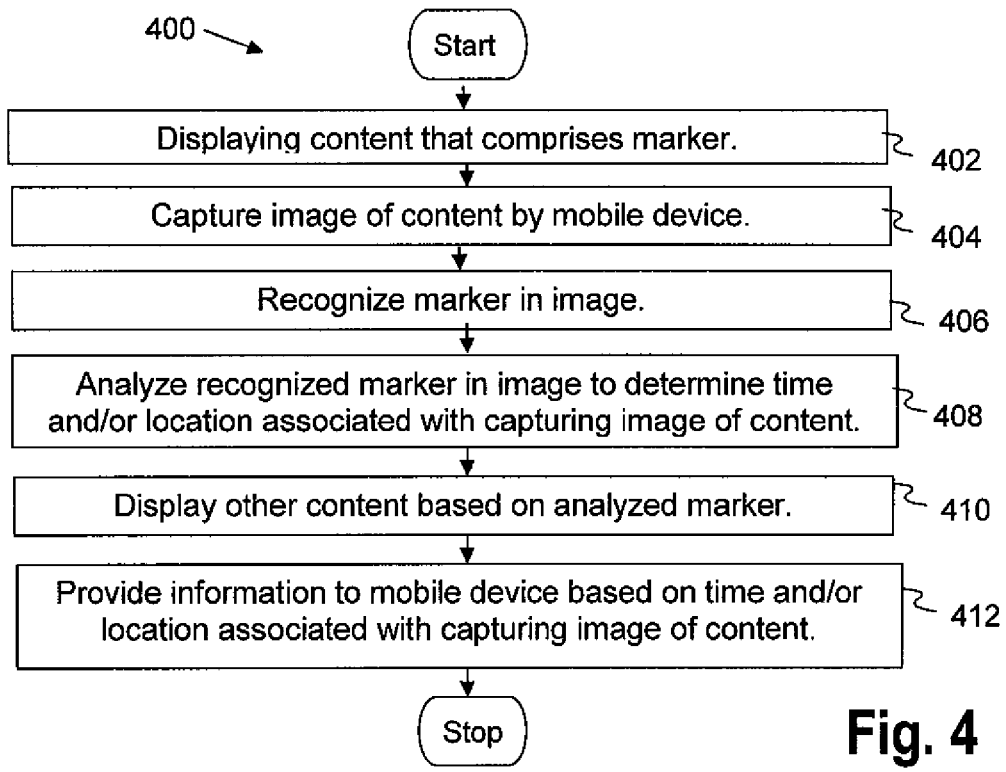
FIG. 4 is a flowchart of yet another method for display adaptation based on captured image feedback according to some embodiments of the present disclosure.

FIG. 4 shows a flowchart of a method 400 for display adaptation based on captured image feedback according to some embodiments of the present disclosure. The system 100 can execute the method 400 to determine the time and place associated with a captured image and to display other content based on the determination.

In box 402, content that comprises a marker is displayed. For example, the display 120 displays a pizza advertisement that includes the marker 122, which is associated with a website address that may be used to provide an electronic coupon for the pizza. The marker 122 also may be a presentation of content. For example, the location of the marker 122 associated with the pizza coupon is displayed on the display 120 at different locations based on the time of day. In another example, the size of the marker 122 on the display 120 may be based on the day of the week. In yet another example, the color of the marker 122 on the display 120 may be based on the geographic location of the display 120.

In box 404, an image of the content is captured by a mobile device. For example, the camera 118 for the mobile device 102 captures an image of the pizza advertisement.

In box 406, the marker is recognized in the image. For example, the communication server 112 receives the image of the pizza advertisement from the mobile device 102, parses the marker 122 from the image, and transmits the image of the marker 122 to the content server 114, which recognizes the marker 122 in the image of the pizza advertisement.

In box 408, the recognized marker in the image is analyzed to determine at least one of a time and a location associated with capturing the image of the content. For example, the content server 114 analyzes the recognized marker 122 in the image of the pizza advertisement to determine that the image of the pizza advertisement was captured between 3:30 and 4:30 on a Wednesday afternoon at the display 120 located at a $27^{th}$ Street downtown address. Although the content server 114 may determine both the time and the location based on analyzing the recognized marker in the image, the content server 114 may determine the time based on the time that the communication server 112 receives the image or the time provided by the network 110. The content server 114 may determine the location based on information from the mobile device 102 or the network 110, such as global positioning system (GPS) location or the cell sector(s) used by the mobile device 102 to communicate the image.

In box 410, another content is displayed based on the analyzed marker. For example, having provided the pizza coupon to fifty mobile devices 102 based on the downtown display 120, the content server 114 provides another advertisement that includes another marker to the downtown display 120 based on a rotation of advertisements. However, a suburban display 120 continues to display the pizza advertisement because only forty mobile devices 102 have requested the pizza coupon based on the suburban display 120.

In box 412, information is optionally provided to a mobile device based on the at least one of the time and the location associated with capturing the image of the content. For example, the communication server 112 provides a 10% discount coupon for a large pizza to the mobile device 102 because the marker 122 indicated the image of the pizza advertisement was captured on a Wednesday afternoon, and on Wednesday afternoons the pizza manufacturer offers 10% discount coupons for a large pizza.

Figure 5:
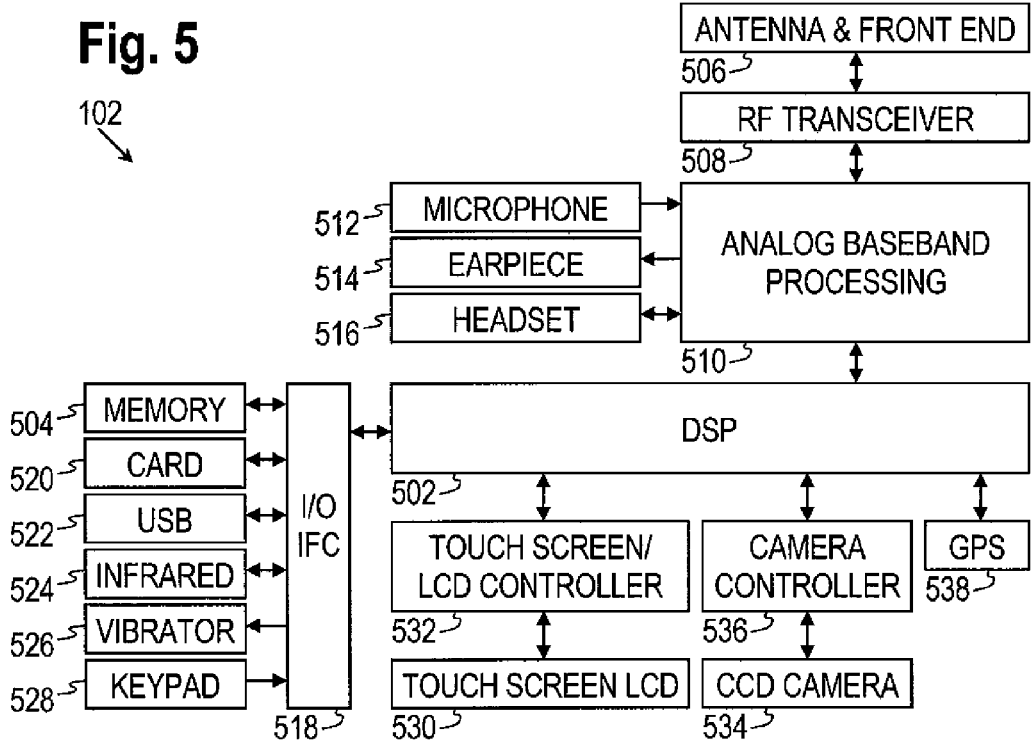
FIG. 5 shows a block diagram of an illustrative mobile device.

FIG. 5 illustrates an exemplary block diagram of the mobile device 102. While a variety of known components of devices 102 are depicted, in an embodiment a subset of the listed components and/or additional components not listed may be included in the device 102. The device 102 includes a digital signal processor (DSP) 502 and a memory 504. As shown, the device 102 may further include an antenna and front end unit 506, a radio frequency (RF) transceiver 508, an analog baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD)

with a touch sensitive surface 530, a touch screen/LCD controller 532, a charge-coupled device (CCD) camera 534, a camera controller 536, and a global positioning system (GPS) sensor 538. In an embodiment, the device 102 may include another kind of display that does not provide a touch sensitive screen. In an embodiment, the DSP 502 may communicate directly with the memory 504 without passing through the input/output interface 518.

The DSP 502 or some other form of controller or central processing unit operates to control the various components of the device 102 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The antenna and front end unit 506 may be provided to convert between wireless signals and electrical signals, enabling the device 102 to send and receive information from a cellular network or some other available wireless communications network, such as a Worldwide Interoperability for Microwave Access (WiMAX) based network, or from a peer device 102. In an embodiment, the antenna and front end unit 506 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 506 may include antenna tuning and/or impedance matching components, RF power amplifiers, and/or low noise amplifiers.

The RF transceiver 508 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 510 and/or the DSP 502 or other central processing unit. In some embodiments, the RF transceiver 508, portions of the antenna and front end 506, and the analog baseband processing unit 510 may be combined in one or more processing units and/or application specific integrated circuits (ASICs).

The analog baseband processing unit 510 may provide various analog processing of inputs and outputs, for example analog processing of inputs from the microphone 512 and the headset port 516 and outputs to the earpiece speaker 514 and the headset port 516. To that end, the analog baseband processing unit 510 may have ports for connecting to the built-in microphone 512 and the earpiece speaker 514 that enable the device 102 to be used as a cell phone. The analog baseband processing unit 510 may further include a port for connecting to a headset or other hands-free microphone and speaker configuration. The analog baseband processing unit 510 may provide digital-to-analog conversion in one signal direction and analog-to-digital conversion in the opposing signal direction. In some embodiments, at least some of the functionality of the analog baseband processing unit 510 may be provided by digital processing components, for example by the DSP 502 or by other central processing units.

The DSP 502 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 502 may perform modulation, coding, interleaving, and spreading, and for a receiver function the DSP 502 may perform despreading, deinterleaving, decoding, and demodulation. In another embodiment, for example in an orthogonal frequency division multiplex access (OFDMA) technology application, for the transmitter function the DSP 502 may perform modulation, coding, interleaving, inverse fast Fourier transforming, and cyclic prefix appending, and for a receiver function the DSP 502 may perform cyclic prefix removal, fast Fourier transforming, deinterleaving, decoding, and demodulation. In other wireless technology applications, yet other signal processing functions and combinations of signal processing functions may be performed by the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the device 102 to function as a peripheral device to exchange information with a personal computer or other computer system. The infrared port 524 and other optional ports such as a Bluetooth interface or an IEEE 802.11 compliant wireless interface may enable the device 102 to communicate wirelessly with other nearby devices and/or wireless base stations.

The input/output interface 518 may further connect the DSP 502 to the vibrator 526 that, when triggered, causes the device 102 to vibrate. The vibrator 526 may serve as a mechanism for silently alerting the user to any of various events such as an incoming call, a new text message, and an appointment reminder.

The keypad 528 couples to the DSP 502 via the interface 518 to provide one mechanism for the user to make selections, enter information, and otherwise provide input to the device 102. Another input mechanism may be the touch screen LCD 530, which may also display text and/or graphics to the user. The touch screen LCD controller 532 couples the DSP 502 to the touch screen LCD 532.

The CCD camera 534 enables the device 102 to take digital pictures. The DSP 502 communicates with the CCD camera 534 via the camera controller 536. The GPS sensor 538 is coupled to the DSP 502 to decode global positioning system signals, thereby enabling the device 102 to determine its position. In another embodiment, a camera operating according to a technology other than Charge Coupled Device cameras may be employed. Various other peripherals may also be included to provide additional functions, e.g., radio and television reception.

Figure 6:
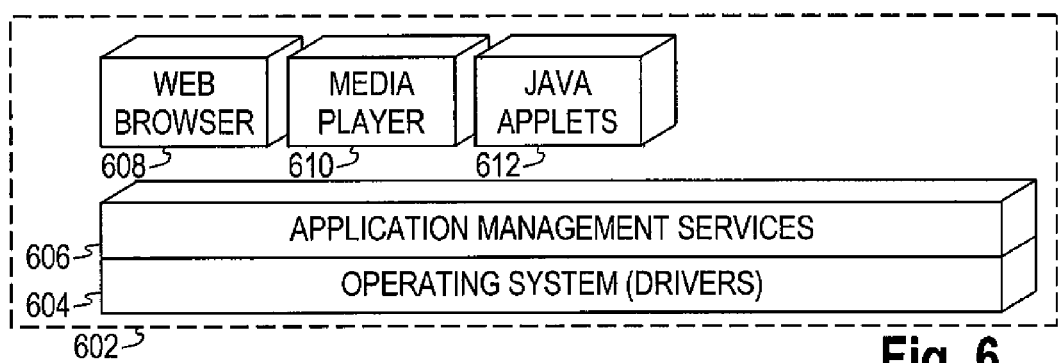
FIG. 6 shows a block diagram of an illustrative software configuration for a mobile device.

FIG. 6 illustrates an exemplary software environment 602 that may be implemented by the DSP 502. The DSP 502 executes operating system drivers 604 that provide a platform from which the rest of the software operates. The operating system drivers 604 provide drivers for the device hardware with standardized interfaces that are accessible to application software. The operating system drivers 604 include application management services ("AMS") 606 that transfer control between applications running on the device 102. Also shown in FIG. 6 are a web browser application 608, a media player application 610, and JAVA applets 612. The web browser application 608 configures the device 102 to operate as a web browser, allowing a user to enter information into forms and select links to retrieve and view web pages. The media player application 610 configures the device 102 to retrieve and play audio or audiovisual media. The JAVA applets 612 configure the device 102 to provide games, utilities, and other functionality.

Figure 7:
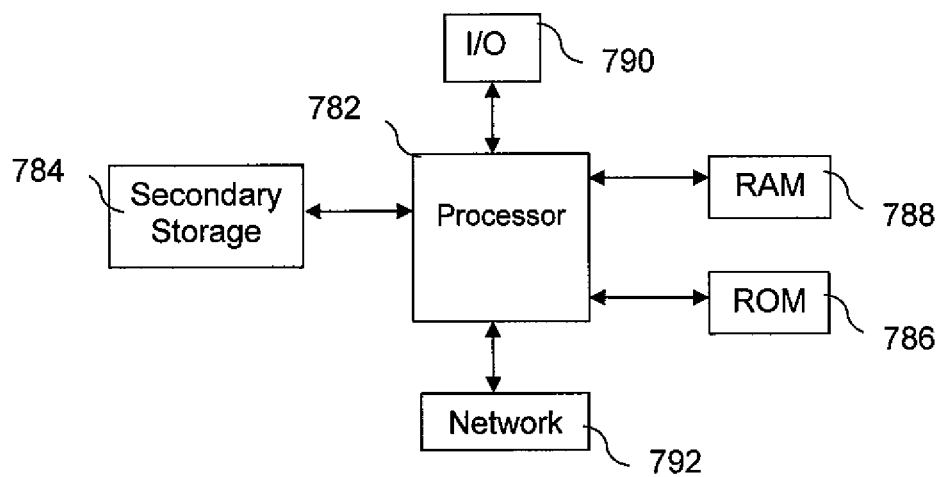
FIG. 7 illustrates an exemplary general-purpose computer system suitable for implementing the several embodiments of the disclosure.

The system described above may be implemented on any general-purpose computer with sufficient processing power, memory resources, and network throughput capability to handle the necessary workload placed upon it. FIG. 7 illustrates a typical, general-purpose computer system suitable for implementing one or more embodiments disclosed herein. The computer system 780 includes a processor 782 (which may be referred to as a central processor unit or CPU) that is in communication with memory devices including secondary storage 784, read only memory (ROM) 786, random access memory (RAM) 788, input/output (I/O) devices 790, and network connectivity devices 792. The processor may be implemented as one or more CPU chips.

The secondary storage 784 is typically comprised of one or more disk drives or tape drives and is used for non-volatile storage of data and as an over-flow data storage device if RAM 788 is not large enough to hold all working data. Secondary storage 784 may be used to store programs which are loaded into RAM 788 when such programs are selected for execution. The ROM 786 is used to store instructions and perhaps data which are read during program execution. ROM 786 is a non-volatile memory device which typically has a small memory capacity relative to the larger memory capacity of secondary storage. The RAM 788 is used to store volatile data and perhaps to store instructions. Access to both ROM 786 and RAM 788 is typically faster than to secondary storage 784.

I/O devices 790 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 792 may take the form of modems, modem banks, Ethernet cards, universal serial bus (USB) interface cards, serial interfaces, token ring cards, fiber distributed data interface (FDDI) cards, wireless local area network (WLAN) cards, WiMAX cards, radio transceiver cards such as code division multiple access (CDMA) and/or global system for mobile communications (GSM) radio transceiver cards, and other well-known network devices. These network connectivity devices 792 may enable the processor 782 to communicate with an Internet or one or more intranets. With such a network connection, it is contemplated that the processor 782 might receive information from the network, or might output information to the network in the course of performing the above-described method steps.

Such information, which may include data or instructions to be executed using processor 782 for example, may be received from and outputted to the network, for example, in the form of a computer data baseband signal or signal embodied in a carrier wave. The baseband signal or signal embodied in the carrier wave generated by the network connectivity devices 792 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 782 executes instructions, codes, computer programs, scripts which it accesses from hard disk, floppy disk, optical disk (these various disk based systems may all be considered secondary storage 784), ROM 786, RAM 788, or the network connectivity devices 792. While only one processor 792 is shown, multiple processors may be present. Thus, while instructions may be discussed as executed by a processor, the instructions may be executed simultaneously, serially, or otherwise executed by one or multiple processors.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A computer implemented method for display adaptation based on captured image feedback, comprising:
displaying content on a digital display that comprises a content marker, wherein the digital display comprises a digital billboard, a digital bulletin, or a digital poster;
receiving an image of the content captured by a mobile device;
determining whether a marker in the received image is recognized;
analyzing the marker in the received image to identify the content marker in response to a determination that the marker in the received image is not recognized;
analyzing the marker in the received image and the identified content marker to determine why the marker in the received image was not recognized;
adjusting the content based on the analysis of the marker in the received image and the identified content marker to improve identification of the content marker in subsequently received images of the content captured by mobile devices; and displaying the adjusted content on the digital display.

2. The computer implemented method of claim 1, wherein the content marker comprises at least one of a symmetrical pattern, an asymmetrical pattern, a moving marker, a one dimensional bar code, a two dimensional bar code, or a color light pattern.

3. The computer implemented method of claim 1, wherein analyzing the marker in the received image to identify the content marker comprises determining a relationship of the image to the content based on at least one of the content, a size of the image, a camera setting, an inferred angle for capturing the image, or an inferred distance for capturing the image.

4. The computer implemented method of claim 1, wherein analyzing the marker in the received image to identify the content marker comprises analyzing at least one of a number of determinations that the marker in the received image is not recognized or a number of determinations that the marker in the received image is recognized.

5. The computer implemented method of claim 1, wherein analyzing the marker in the received image to identify the content marker comprises identifying the content marker based on one of a location associated with capturing the image of the content and a comparison of the image of the content with an image for which the marker in the received image is recognized.

6. The computer implemented method of claim 1, wherein adjusting the content on the digital display comprises at least one of modifying a size of the content marker, modifying a background of the content, modifying a color of the content marker, modifying a brightness of the content, modifying a contrast of the content, or relocating the content marker within the content.

7. The computer implemented method of claim 1, wherein adjusting the content based on the analysis of the marker in the received image and the identified content marker comprises adjusting the content based on analysis of a plurality of markers in received images associated with the content.

8. The computer implemented method of claim 7, wherein the plurality of markers in the received images are each associated with a plurality of cameras that are identified as candidates for capturing the adjusted content to provide a future recognition of the content marker.

9. The computer implemented method of claim 1, further comprising providing a recommendation to a user for adjusting use of a camera based on analysis of the marker in the received image.

10. The computer implemented method of claim 1, further comprising enabling the mobile device associated with the marker in the received image to receive a second image of the content from another mobile device associated with recognizing the content marker in the second image.

11. The computer implemented method of claim 1, further comprising:
   determining a level of activity at the server associated with processing markers in received images of the content from mobile devices;
   selecting another content that comprises another content marker based on the determined level of activity; and
   providing the other content that comprises the other content marker to the digital display, wherein the digital display is further configured to display the other content that comprises the other content marker.

12. The computer implemented method of claim 11, wherein the other content is selected based on a determined level of interest in the other content.

13. The computer implemented method of claim 1, further comprising:
   capturing a second image of a second content by a second mobile device;
   recognizing a second marker in the second image;
   determining at least one of a time or a location associated with capturing the second image of the second content by analyzing the recognized marker in the second image; and
   displaying a third content comprising a third marker based on the at least one of the time or the location associated with capturing the second image of the second content on the digital display.

14. The computer implemented method of claim 13, further comprising providing information to the second mobile device based on the at least one of the time and the location associated with capturing the second image of the second content.

* * * * *